US012668219B2

(12) United States Patent
Zizzadoro

(10) Patent No.: US 12,668,219 B2
(45) Date of Patent: Jun. 30, 2026

(54) AUTOMOTIVE BRAKE CONTROL

(71) Applicant: Joseph P. Zizzadoro, Commack, NY (US)

(72) Inventor: Joseph P. Zizzadoro, Commack, NY (US)

( * ) Notice: Subject to any disclaimer, the term of this patent is extended or adjusted under 35 U.S.C. 154(b) by 697 days.

(21) Appl. No.: 18/099,125

(22) Filed: Jan. 19, 2023

(65) Prior Publication Data

US 2024/0017703 A1 Jan. 18, 2024

Related U.S. Application Data

(60) Provisional application No. 63/300,795, filed on Jan. 19, 2022.

(51) Int. Cl.
*B60T 8/1761* (2006.01)

(52) U.S. Cl.
CPC ............................... *B60T 8/17616* (2013.01)

(58) Field of Classification Search
CPC ...... B60T 8/17616; B60T 7/22; B60T 8/1761; B60T 8/1766; B60T 8/17558; B60T 2201/022; B60T 2210/32; B60W 2520/263
USPC ....................................................... 303/121
See application file for complete search history.

(56) References Cited

U.S. PATENT DOCUMENTS

| | | | | |
|---|---|---|---|---|
| 2006/0108956 | A1* | 5/2006 | Clark | B60W 10/08 318/432 |
| 2012/0253625 | A1* | 10/2012 | Canuto | B60T 11/21 701/72 |
| 2014/0098060 | A1* | 4/2014 | McQuade | G06F 3/045 345/174 |
| 2014/0229086 | A1* | 8/2014 | Udaka | B60T 8/17616 701/75 |
| 2015/0269788 | A1* | 9/2015 | Elliott | G06Q 20/18 701/31.4 |
| 2017/0058811 | A1* | 3/2017 | Misson | F02D 41/2487 |
| 2019/0135277 | A1* | 5/2019 | Min | B60T 7/22 |
| 2020/0062228 | A1* | 2/2020 | Nakabayashi | B60Q 9/008 |
| 2021/0183182 | A1* | 6/2021 | Seidel | G07C 5/0808 |
| 2021/0366207 | A1* | 11/2021 | Seidel | G07C 5/008 |

OTHER PUBLICATIONS

U.S. Appl. No. 19/257,284, filed Jul. 1, 2025, Joseph P. Zizzadoro.

* cited by examiner

*Primary Examiner* — Nicholas J Lane
*Assistant Examiner* — San M Aung
(74) *Attorney, Agent, or Firm* — HG LAW LLP

(57) ABSTRACT

A method for automotive brake control that includes monitoring the status of predetermined vehicle conditions of a vehicle via embedded software. In response to detecting the activation of one or more of the predetermined vehicle conditions, the method also includes monitoring the vehicle to detect in-vehicle selection sequences. In response to detecting an in-vehicle selection sequence by a user, the method includes, based on the in-vehicle selection sequence, sending a brake actuation command to an anti-lock brake module (ABM) of the vehicle via the embedded software, and based on the brake actuation command, actuating a brake control scheme via the ABM.

16 Claims, 15 Drawing Sheets

100
FIG. 1A

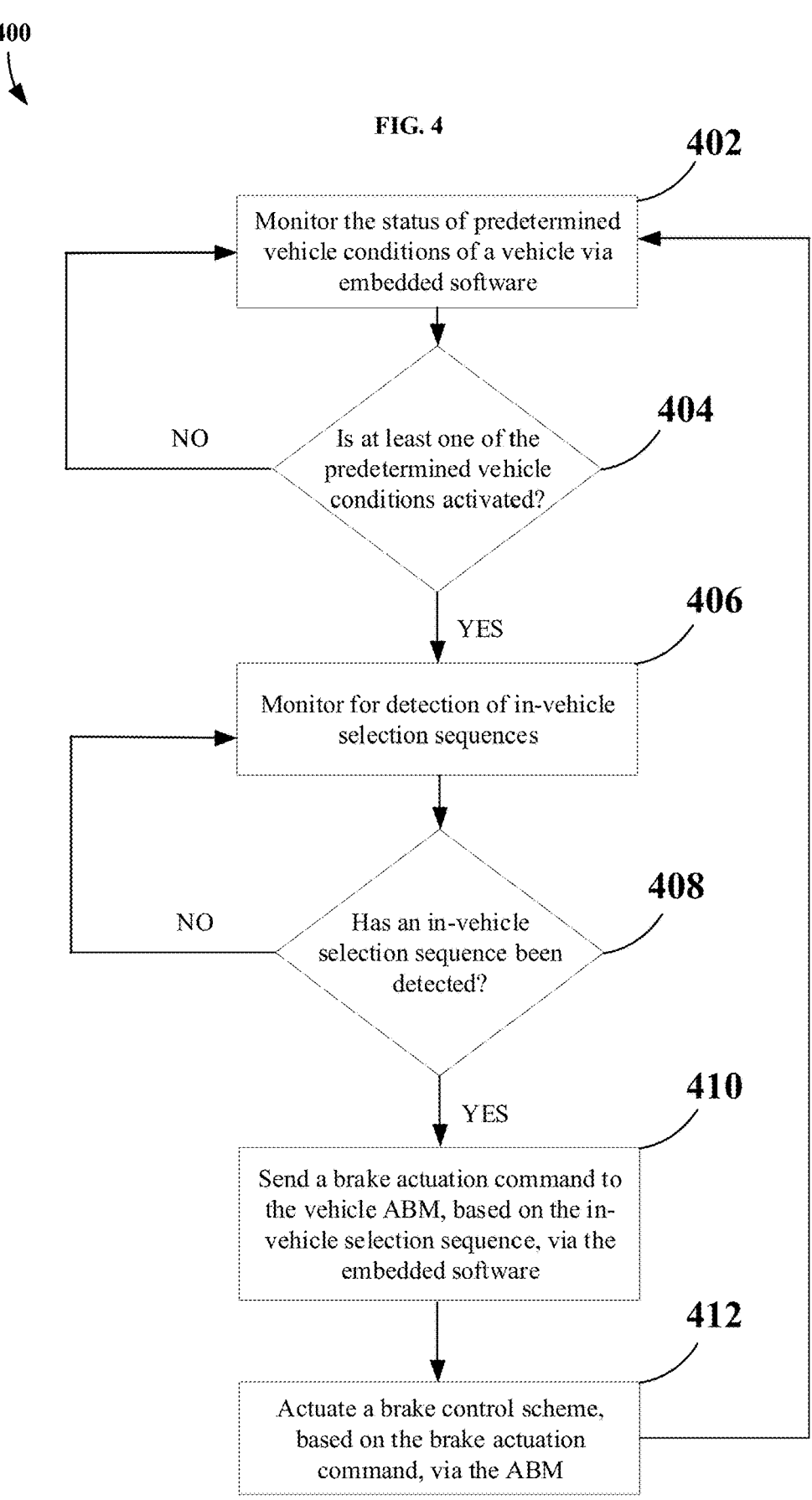

402

Monitor the status of predetermined vehicle conditions of a vehicle via embedded software

404

NO     Is at least one of the predetermined vehicle conditions activated?

YES

406

Monitor for detection of in-vehicle selection sequences

408

NO     Has an in-vehicle selection sequence been detected?

YES

410

Send a brake actuation command to the vehicle ABM, based on the in-vehicle selection sequence, via the embedded software

412

Actuate a brake control scheme, based on the brake actuation command, via the ABM

520

700
FIG. 7
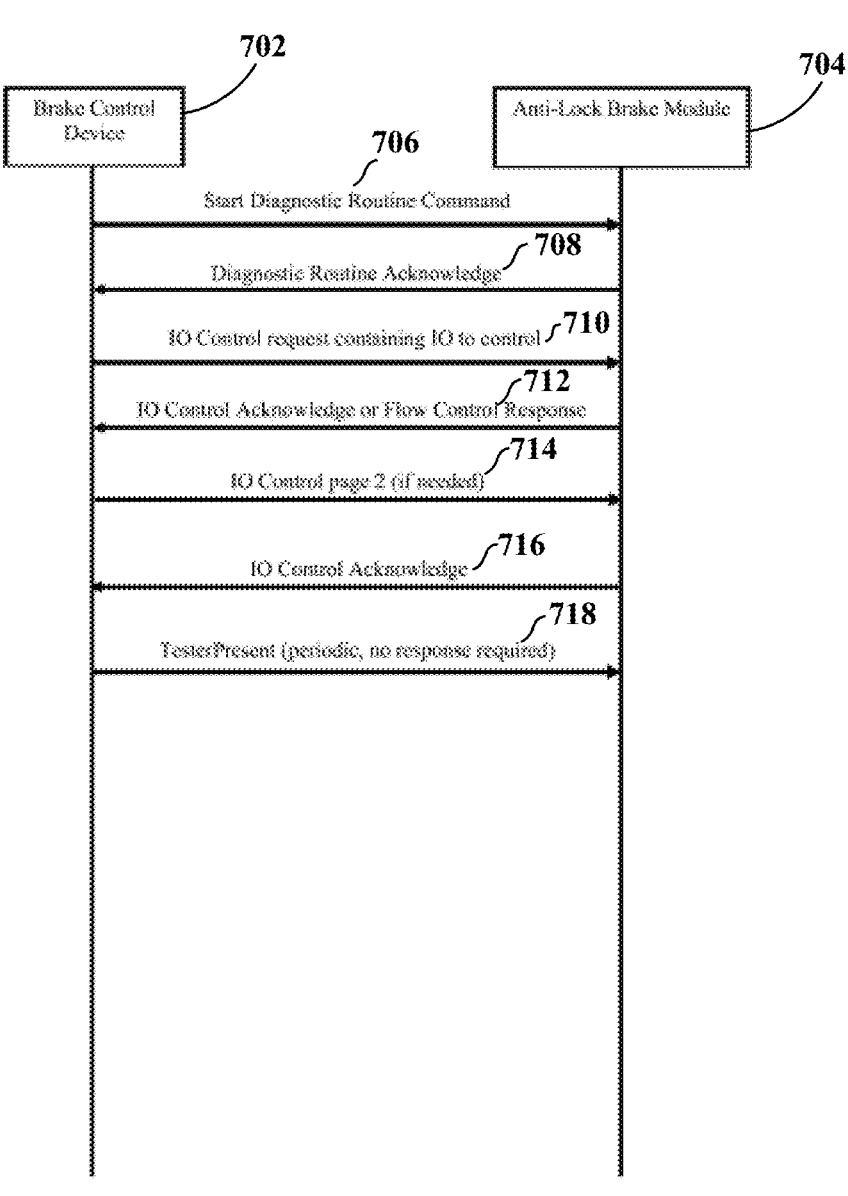

900

940
FIG. 9C
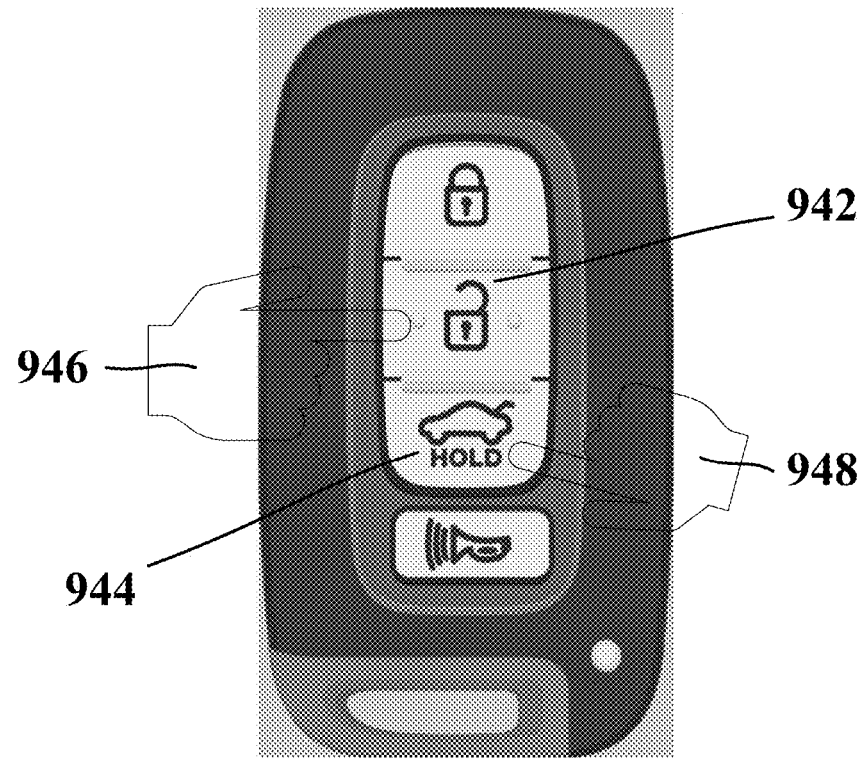

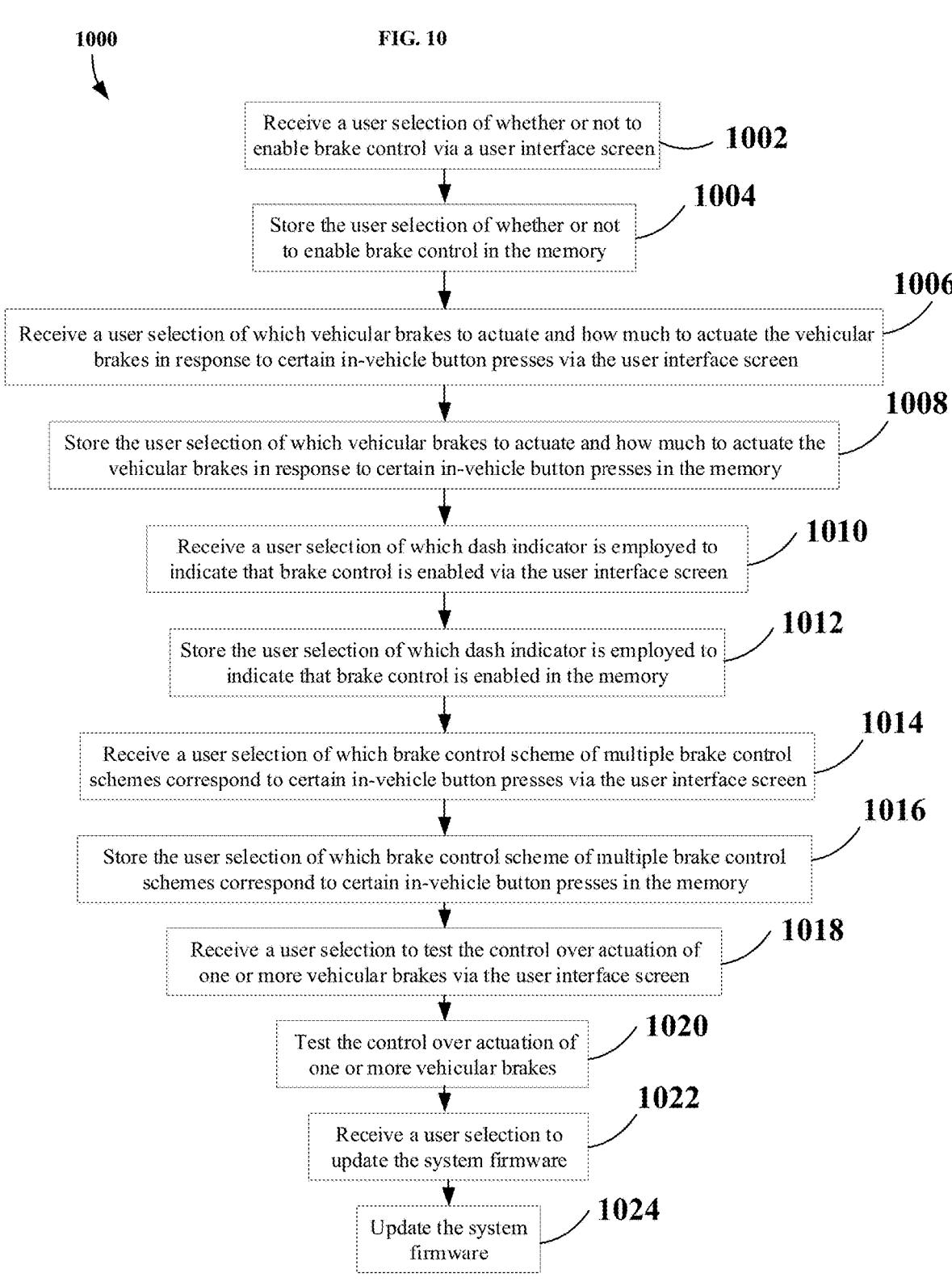

Receive a user selection of whether or not to enable brake control via a user interface screen — 1002

Store the user selection of whether or not to enable brake control in the memory 1004

Receive a user selection of which vehicular brakes to actuate and how much to actuate the vehicular brakes in response to certain in-vehicle button presses via the user interface screen 1006

Store the user selection of which vehicular brakes to actuate and how much to actuate the vehicular brakes in response to certain in-vehicle button presses in the memory 1008

Receive a user selection of which dash indicator is employed to indicate that brake control is enabled via the user interface screen 1010

Store the user selection of which dash indicator is employed to indicate that brake control is enabled in the memory 1012

Receive a user selection of which brake control scheme of multiple brake control schemes correspond to certain in-vehicle button presses via the user interface screen 1014

Store the user selection of which brake control scheme of multiple brake control schemes correspond to certain in-vehicle button presses in the memory 1016

Receive a user selection to test the control over actuation of one or more vehicular brakes via the user interface screen 1018

Test the control over actuation of one or more vehicular brakes 1020

Receive a user selection to update the system firmware 1022

Update the system firmware 1024

1100

AUTOMOTIVE BRAKE CONTROL

CROSS-REFERENCE TO RELATED APPLICATION

This claims the benefit under 35 U.S.C. § 119(e) of commonly owned U.S. Provisional Patent Application No. 63/300,795, filed on Jan. 19, 2022, which is hereby incorporated by reference herein in its entirety.

BACKGROUND

Field

Example aspects herein relate generally to automotive brake control, and, more particularly, to methods, devices, and computer-readable media for automotive brake control and for configuring automotive brake control.

Related Art

Selective automotive braking assistance would be helpful in a variety of circumstances. For instance, a driver of a vehicle may wish to make a tight turn while traveling off-road in the vehicle or traveling upon a surface that diminishes the traction between vehicle and surface. Application of a brake of a single rear wheel of the vehicle (e.g., applying the rear right brake to assist with a tight right turn) can be effective in helping the vehicle make a tight turn in such a circumstance. Effective and convenient means for selectively applying a single rear brake, however, are lacking. Accordingly, a need exists for an improved means of automotive brake control that addresses the foregoing challenges.

SUMMARY

According to an example embodiment herein, a method for automotive brake control is provided. The method includes monitoring the status of predetermined vehicle conditions of a vehicle via embedded software; in response to detecting the activation of one or more of the predetermined vehicle conditions via the embedded software, monitoring the vehicle to detect in-vehicle selection sequences via the embedded software; in response to detecting, via the embedded software, an in-vehicle selection sequence by a user, based on the in-vehicle selection sequence, sending a brake actuation command to an anti-lock brake module (ABM) of the vehicle via the embedded software; and based on the brake actuation command, actuating a brake control scheme via the ABM.

In one example, the method further includes, in response to detecting a second in-vehicle selection sequence via the embedded software, and in response to determining that a brake control scheme is currently actuated, sending a brake disablement command to the ABM of the vehicle via embedded software; and based on the brake disablement command, disabling the brake control scheme via the ABM.

In another example, the method further includes, in response to detecting that none of the predetermined vehicle conditions are activated via the embedded software, and in response to determining that a brake control scheme is currently actuated, sending a brake disablement command to the ABM of the vehicle via the embedded software; and based on the brake disablement command, disabling the brake control scheme via the ABM.

In one example, each of the in-vehicle selection sequences are one or more particular button presses of buttons located on either the dashboard of the vehicle, the steering wheel of the vehicle or key fobs associated with the vehicle, and the brake control scheme is a particular sequence, duration, and brake actuation force level by which to actuate one or more particular brakes of the vehicle.

In a further example, the one or more particular button presses that make up the in-vehicle selection sequences and the particular sequence, duration, and brake actuation force level by which to actuate the one or more particular brakes of the vehicle that make up the brake control scheme are preconfigured by the user via a personal computing application.

In a further example, preconfiguring the personal computing application includes receiving a user selection of whether or not to enable brake control via a user interface screen; receiving a user selection of which brake control scheme of multiple brake control schemes correspond to certain in-vehicle button presses via the user interface screen; receiving a user selection of which vehicular brakes to actuate and how much to actuate the vehicular brakes in response to certain in-vehicle button presses via the user interface screen; receiving a user selection of which dash indicator is employed to indicate that brake control is enabled; receiving, a user selection to test the control over actuation of one or more vehicular brakes via the user interface screen; storing, in the memory, the user selection of whether or not to enable brake control; storing, in the memory, the user selection of which vehicular brakes to actuate and how much to actuate the vehicular brakes in response to certain in-vehicle button presses; storing, in the memory, the user selection of which dash indicator is employed to indicate that brake control is enabled; storing, in the memory, the user selection of which brake control scheme of multiple brake control schemes correspond to certain in-vehicle button presses; testing the control over actuation of one or more vehicular brakes; and upon receiving, from a server, updates to the system firmware, updating the system firmware.

In one example, actuation of one or more predetermined vehicle conditions may be the speed of the vehicle falling beneath a threshold speed, no depression of the brake pedal, the steering wheel being turned within a threshold distance from a left lock or right lock position, or the vehicle entering four-wheel drive.

In one example, the embedded software detects in-vehicle selection sequences by broadcasting information relating to the each in-vehicle selection sequences on a communication bus of an automotive vehicle, wherein the communication bus is a controller area network (CAN) bus.

In another example, the embedded software detects the each in-vehicle selection sequences by polling one or more of a steering column module (SCM) and a wireless control module (WCM) of the vehicle by transmitting an I/O read request and awaiting a response.

In a further example, polling one or more of the SCM and the WCM of the vehicle by transmitting an I/O read request and awaiting a response includes transmitting to one or more of the SCM and the WCM, a command to start a diagnostic session via the embedded software; transmitting, to one or more of the SCM and the WCM, a command to read the each in-vehicle selection sequence, along with the correct values to read the each in-vehicle selection sequence via the embedded software; and transmitting to one or more of the SCM and the WCM, a periodic tester command to ensure the command to read the each in-vehicle selection sequence is running via the embedded software.

In one example, sending the first brake actuation command to the ABM of the vehicle via the embedded software further includes transmitting to the ABM, a command to start a diagnostic session via the embedded software; transmitting to the ABM one or more input/output control commands via the embedded software, wherein the one or more input/output control commands each specify one or more particular vehicle brakes and the actuation level of the each one or more particular vehicle brakes; transmitting to the ABM a periodic tester command to ensure the one or more input/output control commands are running via the embedded software; and transmitting a command to end the diagnostic session via the embedded software.

According to another example embodiment herein, an onboard diagnostic plug-in dongle device for automotive brake control is described. The device includes a shell, a plug, and a PC board. The PC board contains a microcontroller, and a memory. The memory stores instructions that, when executed by the microcontroller, cause the microcontroller to monitor the status of predetermined vehicle conditions of the vehicle, and in response to detecting the activation of one or more of the predetermined vehicle conditions via the embedded software, monitor the vehicle to detect in-vehicle selection sequences via embedded software, and in response to detecting an in-vehicle selection sequence by a user via embedded software, based on the in-vehicle selection sequence, sending a brake actuation command to the ABM of the vehicle, and based on the brake actuation command, actuating a brake control scheme via the ABM, wherein the brake control scheme is a particular sequence, duration, and brake actuation force level by which to actuate one or more particular brakes of the vehicle.

In one example, the PC board contains a controller area network (CAN) controller, a physical layer device (PHY), a universal serial bus (USB) bridge and connector, and an indicator LED.

In a further example, the microcontroller executes the embedded software via the CAN controller and the PHY.

In a further example, the plug is an OBD2 plug, and the plug is installed into the OBD2 diagnostic connector of the vehicle.

In a further example, the plug is installed by unplugging the vehicle security gateway (SGW) module of the vehicle and plugging the device in its place, directly or via an extension cable.

In a further example, the onboard diagnostic plug-in dongle device has a bypass module that bypasses the security gateway (SGW) of the vehicle.

In another example, the microcontroller communicates with a personal computing application via the USB bridge and connector.

In another example, the onboard diagnostic plug-in dongle device aids in tight radius off-road turns by locking or dragging the inside rear tire of the direction turning.

According to another example embodiment herein, a non-transitory computer-readable medium is described. The non-transitory computer-readable medium has instructions stored thereon that, when executed by the microcontroller of the onboard diagnostic plug-in dongle, cause the microcontroller to perform a method for automotive brake control. The method includes monitoring the status of predetermined vehicle conditions of a vehicle via embedded software; and in response to detecting the activation of one or more predetermined vehicle conditions via embedded software, monitoring the vehicle to detect in-vehicle selection sequences via embedded software; and in response to detecting, via the embedded software, an in-vehicle selection sequence by a user, based on the in-vehicle selection sequence, sending, via the embedded software, a brake actuation command to an anti-lock brake module (ABM) of the vehicle; and based on the brake actuation command, actuating a brake control scheme via the ABM, wherein the brake control scheme is a particular sequence, duration, and brake actuation force level by which to actuate one or more particular brakes of the vehicle.

BRIEF DESCRIPTION OF THE DRAWINGS

Various aspects and features of the present disclosure are described herein below with references to the drawings, wherein:

FIG. 1A is an example onboard diagnostic plug-in device, in accordance with the present disclosure;

FIG. 4 is a process flow diagram that illustrates an example procedure for automotive brake control, in accordance with the present disclosure;

FIG. 7 is a process flow diagram that illustrates aspects of the manner in which the embedded software sends brake actuation commands to the ABM of the vehicle, in accordance with the present disclosure;

FIG. 9C illustrates aspects of the manner in which in-vehicle selection sequences may be received through button presses by the user on the vehicle key fob, in accordance with the present disclosure;

FIG. 10 is a process flow diagram that illustrates an example procedure for preconfiguring the personal computing application, in accordance with the present disclosure;

DETAILED DESCRIPTION

The present disclosure is directed towards methods, devices, and computer-readable media for automotive brake control and for configuring automotive brake control. In general, the methods, devices, and computer-readable media provide a means of controlling automotive brakes, for instance, to enable one or more vehicular brakes to be selectively actuated, for example, by way of one or more steering wheel buttons or other buttons of the vehicle, which is helpful in making tight turns, for instance, while traveling off-road on unpaved surfaces.

Reference is now made to FIG. 1A, which is an example onboard diagnostic plug-in device 100, in accordance with the present disclosure. The onboard diagnostic plug-in device 100 includes a plastic shell 102 and an OBD2 plug 104.

Figure 1B:
FIG. 1B is an example onboard diagnostic plug-in device, in accordance with the present disclosure.

Reference is now made to FIG. 1B, which is an example onboard diagnostic plug-in device 110, in accordance with the present disclosure. The onboard diagnostic plug-in device 110 includes a plastic shell 112 and a vehicle SGW module plug 114. In some embodiments, the onboard diagnostic plug-in device 110 may be installed by unplugging a vehicle SGW module and plugging the onboard diagnostic plug-in device 110 in its place by the vehicle SGW module plug 114, directly or via an extension cable.

Figure 2:
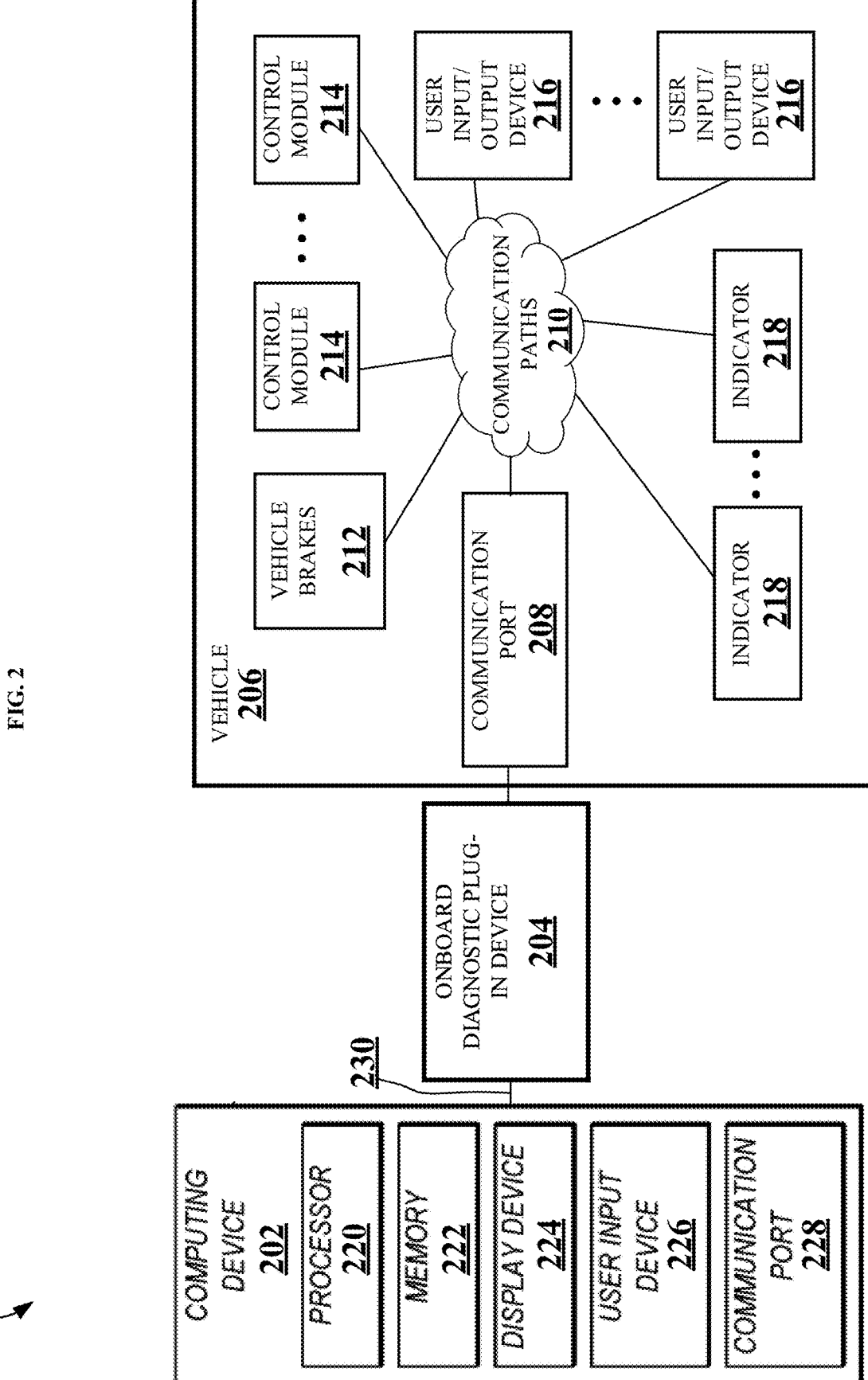
FIG. 2 is a schematic block diagram of an example system for automotive brake control, in accordance with the present disclosure.

Reference is now made to FIG. 2, which is a schematic block diagram of an example system 200 for automotive brake control, in accordance with the present disclosure. The system 200 includes a computing device 202, an onboard diagnostic plug-in device 204, and a vehicle 206. The computing device 202 includes a processor 220, a memory 222, a display device 224, a user input device 226, and a communication port 228. In some embodiments, the computing device 202 is further represented by the computing device 1100 illustrated in FIG. 11, which is described in further detail below. The vehicle 206 includes a communication port 208, communication paths 210, vehicle brakes 212, one or more control modules 214, one or more user input/output devices 216, and one or more indicators 218. Various ones of the communication port 208, the vehicle brakes 212, the one or more control modules 214, the one or more user input/output devices 216, and the one or more indicators 218 are communicatively coupled to one another by way of the communication paths 210. In some embodiments, the onboard diagnostic plug-in device 204 is the onboard diagnostic plug-in device 100 of FIG. 1A. In some embodiments, the onboard diagnostic plug-in device 204 is the onboard diagnostic plug-in device 110 of FIG. 1B.

The communication port 208 is a port by which the onboard diagnostic plug-in device 204 can be coupled to, and communicate with, various components of the vehicle 206. In some examples, the communication port is an on-board diagnostics (OBD) port, such as an OBD2 port, that is defined in accordance with a standard, such as the SAE J1962 standard, and that is included on the vehicle 206 by the manufacturer to facilitate diagnosis of various components and/or subsystems of the vehicle 206 using diagnostic equipment.

The communication paths 210 are paths by which one or more signals or messages may be communicated among the communication port 208, vehicle brakes 212, one or more control modules 214, one or more user input/output devices

216, and/or the one or more indicators 218. When the onboard diagnostic plug-in device 204 is coupled to the communication port 208, the communication paths 210 facilitate communication of one or more signals or messages between the onboard diagnostic plug-in device 204 and vehicle brakes 212, one or more control modules 214, one or more user input/output devices 216, and/or one or more indicators 218. The communication paths 210 may include any type of communication paths suitable for such communication. In one example, the communication paths 210 include a standardized bus, such as a controller area network (CAN) bus.

The vehicle brakes 212 are brakes installed within the vehicle 206 that may be actuated to stop the motion of one or more wheels of the vehicle.

The one or more control modules 214 are electronic modules that include hardware and/or software components that cooperate to control one or more components and/or subsystems of vehicle 206. Example types of the control modules 214 include, without limitation, a body control module, an anti-lock brake control module (ABM), a cruise control module, a security module, an active damping control module, an occupant restraint control module, a park assist control module, a powertrain control module, a radio control module, a steering column control module, and/or the like.

The user input/output devices 216 generally include devices by which the user may provide input (for example, input relating to one or more brake actuation patterns and/or input to control the onboard diagnostic plug-in device 204) and/or devices by which the user may be provided with output (for example, output relating to one or more illumination patterns and/or output indicating a state of the onboard diagnostic plug-in device 204). Example types of the user input/output devices 216 include, without limitation, a steering wheel button, a dashboard button, a wireless key fob button, a button located on a door of the vehicle, a key ignition, a voice-based user input device, a dashboard screen, a console screen, audio speakers, and/or the like. The user may provide input to the vehicle 206 and/or to the onboard diagnostic plug-in device 204, by providing one or more user input commands (for example, a single command or a combination of commands) to one or more of the user input/output devices 216.

The indicators 218 are indicators within the vehicle 206 that report to the driver of the vehicle 206 important information about how the vehicle 206 is traveling. Example types of the indicators 218 include, without limitation, a four-wheel drive indicator, a speedometer, and/or the like.

As described in further detail herein, the onboard diagnostic plug-in device 204 is communicatively and independently couplable to the computing device 202 and to the vehicle 206 by way of communication ports, of which only some are shown in FIG. 2. The onboard diagnostic plug-in device 204, when coupled to the vehicle 206 (for instance, by being plugged into the communication port 208), enables the user to control automotive brake actuation (for example, including causing actuation of one or more vehicle brakes 212) of the vehicle 206. The computing device 202, when coupled to the onboard diagnostic plug-in device 204 (for example, by way of the communication port 208 and a communication path of the communication paths 210), enables the user to configure automotive brake control. For instance, the user can input commands to the computing device 202 to cause the onboard diagnostic plug-in device 204 to locally store a variety of settings for various brake actuation patterns, as described in further detail below.

Figure 3:
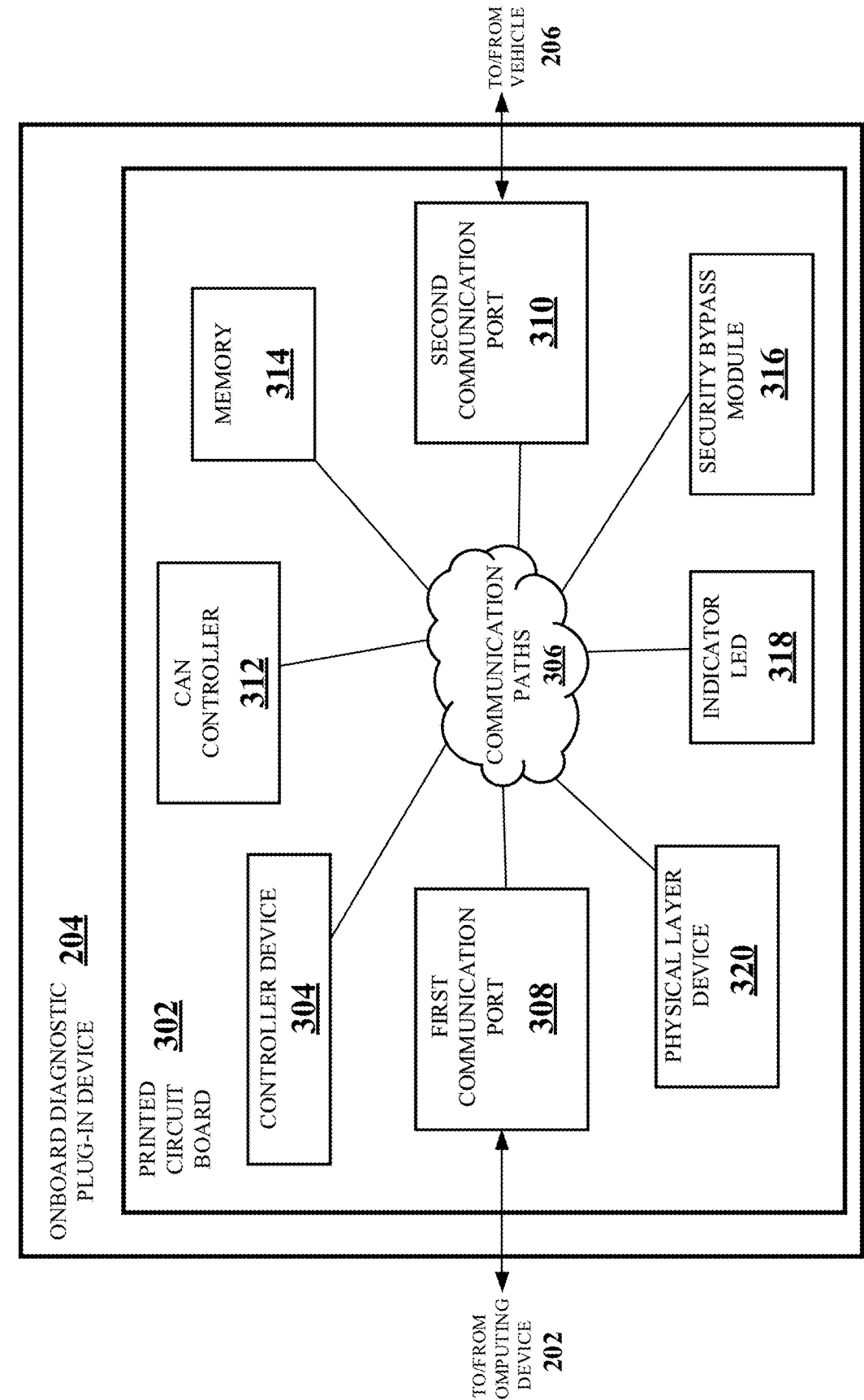
FIG. 3 is a schematic block diagram of an example onboard diagnostic plug-in device for automotive lamp illumination control that may be included in the system of FIG. 2, in accordance with the present disclosure.

Having provided an overview of the system 200 for automotive brake control in the context of FIG. 2, reference is made to FIG. 3 to describe additional aspects of the onboard diagnostic plug-in device 204 of the system 200, in accordance with the present disclosure. Additionally, in some embodiments, the onboard diagnostic plug-in device 204 is further represented by the computing device 1100 illustrated in FIG. 11, which is described in further detail below. Referring to FIG. 3, the onboard diagnostic plug-in device 204 includes a printed circuit board 302. The printed circuit board 302 includes a controller device 304, communication paths 306, a first communication port 308, a second communication port 310, a CAN controller 312, a memory 314, a security bypass module 316, an indicator LED 318, and a physical layer device 320. Various ones of the controller device 304, the first communication port 308, the second communication port 310, the CAN controller 312, the memory 314, the security bypass module 316, the indicator LED 318, and the physical layer device 320 are communicatively coupled to one another by way of the communication paths 306.

The controller device 304 controls the operation and/or functionality of the onboard diagnostic plug-in device 204. In some embodiments, the controller device 304 executes an embedded program that communicates with the vehicle via one or more of the CAN controller 312 and the physical layer device 320. The controller device 304 also can communicate with the computing device 202 for configuration and updates via the communication port 228, as described further below with reference to FIG. 8. In some embodiments, after the onboard diagnostic plug-in device 204 is powered on, the controller device 304 executes an embedded program to configure the CAN controller 312 and the first communication port for proper baud rates. In some embodiments, the controller device 304 causes one or more vehicle brakes of the vehicle brakes 212 to be actuated, as described further below in reference to FIG. 4, FIG. 5A, and FIG. 5B. In some embodiments, the controller device 304 causes one or more vehicle brakes of the vehicle brakes 212 to be disabled, as described further below in reference to FIG. 5A and FIG. 5B. In some embodiments, the controller device 304 causes embedded software to read inputs from one or more of the user input/output devices 216, as described further below with reference to FIG. 6. In some embodiments, the controller device 304 causes embedded software to transmit commands to the control module of the one or more control modules 214 that controls the brakes, as described further below with reference to FIG. 7.

In various embodiments, the controller device 304 may be a microcontroller (such as, for example, an Atmel® AT90CAN32 microcontroller, an Atmel® AT90CAN64 microcontroller, an Atmel® ATmega48A microcontroller, or an Atmel® ATmega328A microcontroller), a processor (such as the processor 1104 described below), or any other type of device that controls the operation and/or functionality of the onboard diagnostic plug-in device 204.

As mentioned above, the communication paths 306 communicatively couple the components of the onboard diagnostic plug-in device 204 to another. The communication paths 306 may include any type of communication paths suitable to facilitate communication. In one example, one or more components of the onboard diagnostic plug-in device 204 are mounted to a substrate, such as the printed circuit board 302 and the communication paths 306 include conductive traces deposited on or within the substrate.

The first communication port 308 is a port by which the onboard diagnostic plug-in device 204 may be communicatively coupled to the computing device 202, for example, by way of the communication port 228. In some embodiments, the first communication port 308 and the communication port 228 are USB ports, the communication path 230 includes a USB cable, and the onboard diagnostic plug-in device 204 is communicatively couplable to the communication port 228 of the computing device 202 by way of the USB cable of the communication path 230.

The second communication port 310 is a port by which the onboard diagnostic plug-in device 204 can be communicatively coupled with one or more components of the vehicle 206 by way of the communication port 208 of the vehicle 206. In one example, the second communication port 310 is an OBD port, such as an OBD2 port, that is defined in accordance with a standard, such as the SAE J1962 standard, and that is couplable to an OBD port (for example, communication port 208) included on the vehicle 206 by the manufacturer. In this manner, the onboard diagnostic plug-in device 204 is a plug-and-play-type device that can easily be coupled to the vehicle 206 and decoupled from the vehicle 206.

The memory 314 is any memory that stores data, instructions, and/or other types of information that the controller device 304 can utilize to effect the operation and/or functionality of the onboard diagnostic plug-in device 204. The memory 314 may be a standalone memory component or may be integrated into one or more other components of the onboard diagnostic plug-in device 204, such as controller device 304. The memory 314 stores, among other information, instructions that the controller device 304 executes to effect the operation and/or functionality of the onboard diagnostic plug-in device 204, for instance, by implementing steps of the procedures described herein.

In some embodiments, the security bypass module 316 bypasses a security gateway of vehicle 206.

In some embodiments, the indicator LED 318 may be illuminated to indicate status information.

Additionally, although not shown in FIG. 3, in various embodiments, the onboard diagnostic plug-in device 204 also includes one or more additional components that enable the onboard diagnostic plug-in device 204 to function. Example types of such additional components include a crystal or other clock source that generates a clock signal to be used by one or more of the components of the onboard diagnostic plug-in device 204; one or more power supply components, for instance, a Texas Instruments® uA78L05CPKR voltage regulator, that generates a low voltage power signal, such as a 5 volt power signal, from a higher voltage power signal, such as a 12 volt power signal, that is provided to the onboard diagnostic plug-in device 204 by the vehicle 206 by way of one or more conductors of the communication port 208 and the second communication port 310; a programming header that is couplable to a programming device to enable the controller device 304 and/or the memory 314 to be programmed with instructions or other information; passive components, such as resistors, inductors, and/or capacitors, and/or the like.

Having described the system 200 for automotive brake control and the onboard diagnostic plug-in device 204 in the context of FIG. 2 and FIG. 3, reference is now made to FIG. 4 to describe an example procedure 400 for automotive brake control by using the onboard diagnostic plug-in device 204 of the system 200, in accordance with the present disclosure. The procedure 400, in some examples, begins when the onboard diagnostic plug-in device 204 is plugged into the communication port 208 and receives power from the vehicle 296 by way of one or more pins or conductors of the communication port 208.

At block 402, controller device 304 monitors the status of predetermined vehicle conditions of vehicle 206 via embedded software. This may entail, for example, monitoring the brake pedal depression of the vehicle 206, monitoring the position of the steering wheel of vehicle 206, or monitoring the status of any one of indicators 218, e.g., the speedometer or the four-wheel drive indicator. The predetermined vehicle conditions of vehicle 206 may be preset by a user of computing device 202. The procedure 400 then progresses to block 404.

At block 404, a determination is made as to whether at least one of the predetermined vehicle conditions of vehicle 206 is activated. In particular, for instance, the controller device 304 detects whether one or more of the following conditions has occurred: the speed of the vehicle 206 falling beneath a threshold speed as indicated by one of the one or more indicators 218, no depression of the brake pedal of vehicle 206, the steering wheel of vehicle 206 being turned within a threshold distance from a left lock or right lock position, and/or the vehicle 206 entering four-wheel drive as indicated by one of the one or more indicators 218.

If it is determined at block 404 that none of the predetermined vehicle conditions are activated ("NO" at 404), then the procedure 400 returns to block 402. If, on the other hand, it is determined at block 404 that one or more of the predetermined vehicle conditions are activated ("YES" at 404), then the procedure 400 progresses to block 406. In some embodiments, any combination of the predetermined vehicle conditions must be activated in order for the procedure 400 to progress to block 406. In this example, the combination of predetermined vehicle conditions that must be activated may be preset by a user of computing device 202.

At block 406, controller device 304 monitors for detection of in-vehicle selection sequences of vehicle 206 via embedded software. In particular, controller device 304 is monitoring for detection of user input commands from one or more user input/output devices 216. In some embodiments, the controller device 304 causes embedded software to monitor for inputs from one or more of the user input/output devices 216, as described further below with reference to FIG. 6. The procedure 400 then progresses to block 408.

At block 408, a determination is made as to whether an in-vehicle selection sequence has been detected. In particular, for instance, the controller device 304 detects whether a user input command has been entered by way of one or more of the user input/output devices 216. In some embodiments, a user may enter the user input command by interacting with one or more of the user input/output devices individually (e.g., by entering a predetermined command), or in some simultaneous combination (e.g., pressing the "unlock" and the "open trunk" button on a key fob at the same time) or sequential combination (e.g., entering a predetermined combination of commands). In some embodiments, the detection of user input command entries varies by vehicle. On some vehicles, user input information, e.g., button press information, is constantly broadcast on a CAN bus, in which case, the determination at block 408 includes monitoring the one or more user input/output devices 216 for user input as it is broadcasted. In other vehicles, one or more control modules 214 (for example, a steering column module (SCM) or a wireless control module (WCM), sometimes referred to as a radio frequency hub (RF HUB)) are polled at block 408 by sending an I/O read request and waiting for a response, as described further below with reference to FIG. 6.

If it is determined at block 408 that no in-vehicle selection sequence has been detected ("NO" at 408), then the procedure 400 returns to block 406. If, on the other hand, it is determined that an in-vehicle selection sequence has been detected ("YES" at 408), then the procedure 400 progresses to block 410. At block 410, the controller device 304 sends, via embedded software, a brake actuation command to one of the one or more control modules 214, e.g., the anti-lock brake module (ABM), of vehicle 206. The particular brake actuation command is based on the in-vehicle selection sequence. In some embodiments, the memory 314 stores a list of multiple in-vehicle selection sequences corresponding to brake actuation commands, and at block 410 the in-vehicle selection sequence is matched to one of the brake actuation commands on the list. The transmission of the brake actuation command is described in further detail below, in reference to FIG. 7. The procedure 400 then progresses to block 412. At block 412, the controller device 304 actuates the brake control scheme that matches the brake actuation command via the ABM. The brake control scheme may be a full or partial actuation of any one or a combination of the vehicle brakes 212.

Figure 5A:
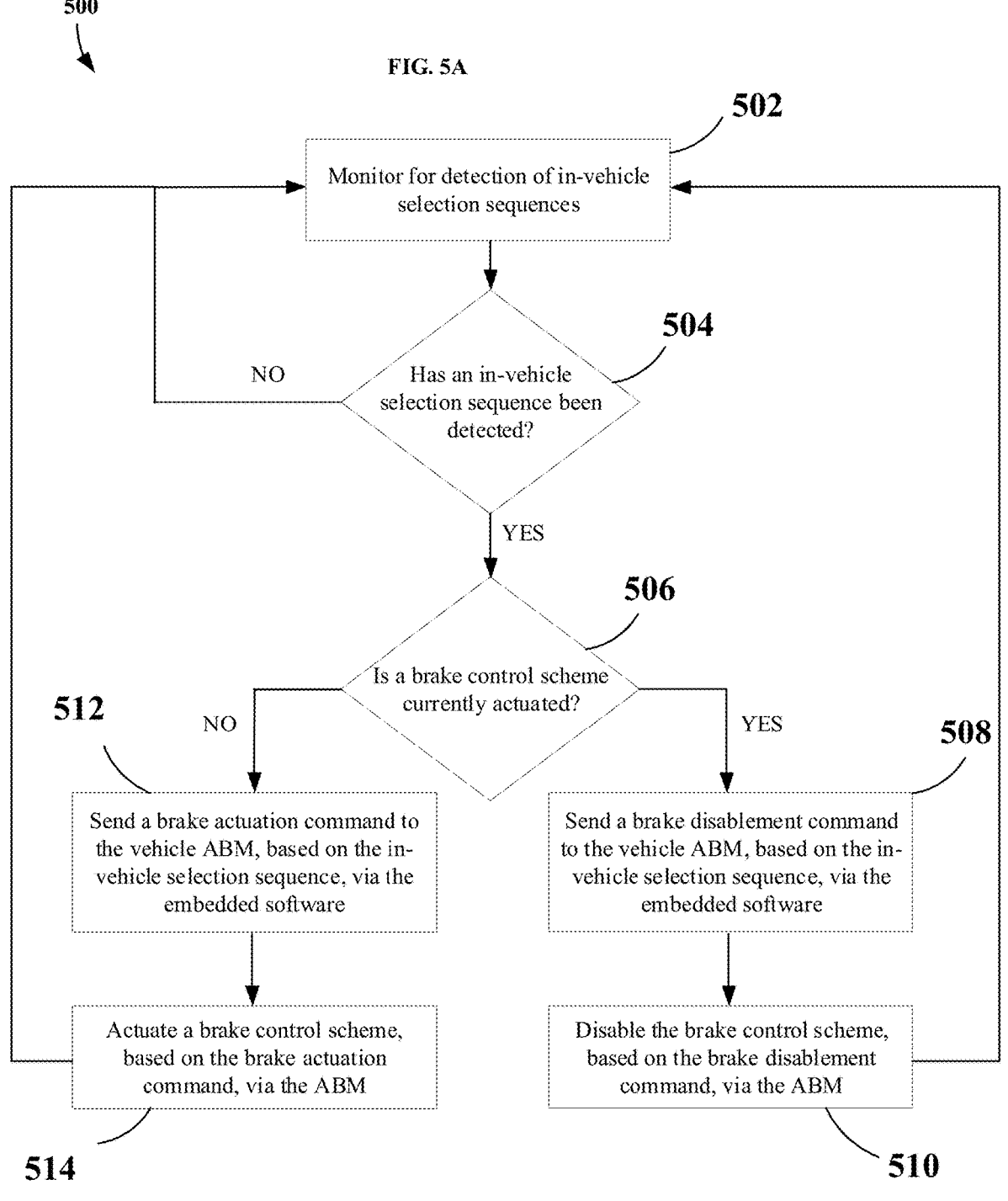
FIG. 5A is a process flow diagram that illustrates additional aspects of the example procedure for automotive brake control of FIG. 4, in accordance with the present disclosure.

Reference is now made to FIG. 5A, which is a process flow diagram that illustrates additional aspects of the example procedure for automotive brake control of FIG. 4, in accordance with the present disclosure. At block 502, controller device 304 monitors for detection of in-vehicle selection sequences of vehicle 206 via embedded software. In particular, controller device 304 is monitoring for detection of user input commands from one or more user input/output devices 216. In some embodiments, the controller device 304 causes embedded software to monitor for inputs from one or more of the user input/output devices 216, as described further below with reference to FIG. 6. The procedure 500 then progresses to block 504.

At block 504, a determination is made as to whether an in-vehicle selection sequence has been detected. In particular, for instance, the controller device 304 detects whether a user input command has been entered by way of one or more of the user input/output devices 216. In some embodiments, a user may enter the user input command by interacting with one or more of the user input/output devices individually (e.g., by entering a predetermined command), or in some simultaneous combination (e.g., pressing the "unlock" and the "open trunk" button on a key fob at the same time) or sequential combination (e.g., entering a predetermined combination of commands). In some embodiments, the detection of user input command entries varies by vehicle. On some vehicles, user input information, e.g., button press information, is constantly broadcast on a CAN bus, in which case, the determination at block 408 includes monitoring the one or more user input/output devices 216 for user input as it is broadcasted. In other vehicles, one or more control modules 214 (for example, a steering column module (SCM) or a wireless control module (WCM), sometimes referred to as a radio frequency hub (RF HUB)) are polled at block 408 by sending an I/O read request and waiting for a response, as described further below with reference to FIG. 6.

If it is determined at block 504 that no in-vehicle selection sequence has been detected ("NO" at 504), then the procedure 500 returns to block 502. If, on the other hand, it is determined that an in-vehicle selection sequence has been detected ("YES" at 504), then the procedure 500 progresses to block 506. At block 506, a determination is made as to whether a brake actuation scheme is currently actuated. In particular, for instance, the controller device 304 detects whether one or more of the vehicle brakes 212 are currently actuated in accordance with a listed brake actuation command stored in the memory 314.

If it is determined at block 506 that no brake actuation scheme is currently actuated ("NO" at 506), then the procedure 500 progresses to block 512. If, on the other hand, it is determined that a brake actuation scheme is currently actuated ("YES" at 506), then the procedure 500 progresses to block 508.

At block 508, the controller device 304 sends, via embedded software, a brake disablement command to one of the one or more control modules 214, e.g., the anti-lock brake module (ABM), of vehicle 206. The transmission of the brake disablement command is described in further detail below, in reference to FIG. 7. The procedure 500 then progresses to block 510. At block 510, the controller device 304 disables the brake control scheme, based on the brake disablement command, via the ABM. In some embodiments, disabling the brake control scheme results in all of the brakes that were actuated immediately no longer being actuated, and control of brake actuation returning to the user via the brake pedal. In other embodiments, disabling the brake control scheme results in all of the brakes immediately being fully actuated, e.g., stopping the car, and the control of brake actuation then returning to the user via the brake pedal once the user accelerates the car from the full stop. Procedure 500 then returns to block 502.

At block 512, the controller device 304 sends, via embedded software, a brake actuation command to one of the one or more control modules 214, e.g., the anti-lock brake module (ABM), of vehicle 206. The particular brake actuation command is based on the in-vehicle selection sequence. In some embodiments, the memory 314 stores a list of multiple in-vehicle selection sequences corresponding to brake actuation commands, and at block 410 the in-vehicle selection sequence is matched to one of the brake actuation commands on the list. The transmission of the brake actuation command is described in further detail below, in reference to FIG. 7. The procedure 500 then progresses to block 514. At block 514, the controller device 304 actuates the brake control scheme that matches the in-vehicle selection sequence via the ABM. The brake control scheme may be a full or partial actuation of any one or a combination of the vehicle brakes 212. The procedure 500 then returns to block 502.

Figure 5B:
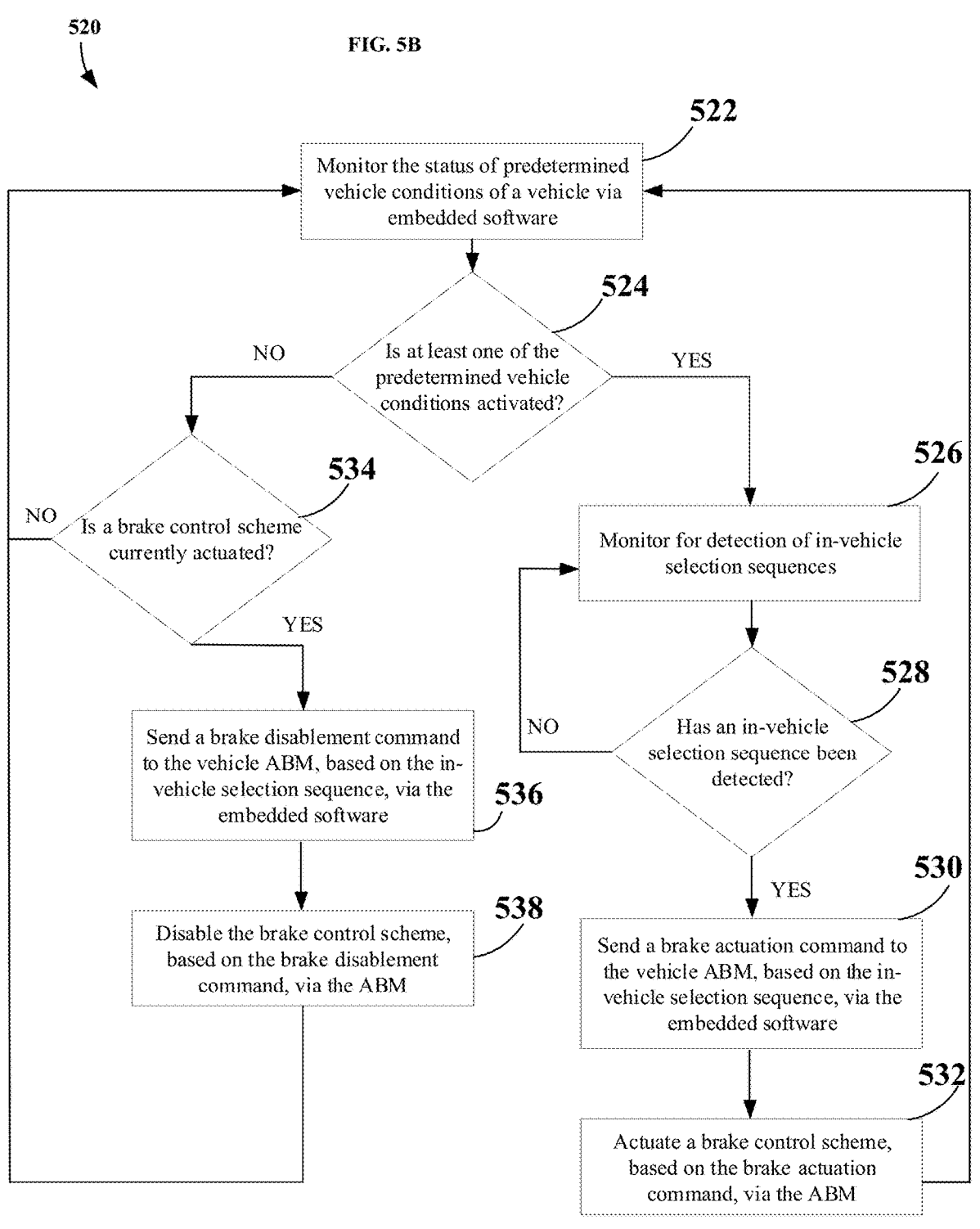
FIG. 5B is a process flow diagram that illustrates still further aspects of the example procedure for automotive brake control of FIG. 4, in accordance with the present disclosure.

Reference is now made to FIG. 5B, which is a process flow diagram that illustrates still further aspects of the example procedure for automotive brake control of FIG. 4, in accordance with the present disclosure. At block 522, controller device 304 monitors for detection of in-vehicle selection sequences of vehicle 206 via embedded software. In particular, controller device 304 is monitoring for detection of user input commands from one or more user input/output devices 216. In some embodiments, the controller device 304 causes embedded software to monitor for inputs from one or more of the user input/output devices 216, as described further below with reference to FIG. 6. The procedure 520 then progresses to block 524.

At block 524, a determination is made as to whether at least one of the predetermined vehicle conditions of vehicle 206 is activated. In particular, for instance, the controller device 304 detects whether one or more of the following conditions has occurred: the speed of the vehicle 206 falling beneath a threshold speed as indicated by one of the one or more indicators 218, no depression of the brake pedal of vehicle 206, the steering wheel of vehicle 206 being turned within a threshold distance from a left lock or right lock position, and/or the vehicle 206 entering four-wheel drive as indicated by one of the one or more indicators 218.

If it is determined at block 524 that none of the predetermined vehicle conditions are activated ("NO" at 524), then the procedure 520 progresses to block 534. If, on the other hand, it is determined at block 524 that one or more of the predetermined vehicle conditions are activated ("YES" at 524), then the procedure 520 progresses to block 526. In some embodiments, any combination of the predetermined vehicle conditions must be activated in order for the procedure 520 to progress to block 526. In this example, the combination of predetermined vehicle conditions that must be activated may be preset by a user of computing device 202.

At block 526, controller device 304 monitors for detection of in-vehicle selection sequences of vehicle 206 via embedded software. In particular, controller device 304 is monitoring for detection of user input commands from one or more user input/output devices 216. In some embodiments, the controller device 304 causes embedded software to monitor for inputs from one or more of the user input/output devices 216, as described further below with reference to FIG. 6. The procedure 520 then progresses to block 528.

At block 528, a determination is made as to whether an in-vehicle selection sequence has been detected. In particular, for instance, the controller device 304 detects whether a user input command has been entered by way of one or more of the user input/output devices 216. In some embodiments, a user may enter the user input command by interacting with one or more of the user input/output devices individually (e.g., by entering a predetermined command), or in some simultaneous combination (e.g., pressing the "unlock" and the "open trunk" button on a key fob at the same time) or sequential combination (e.g., entering a predetermined combination of commands). In some embodiments, the detection of user input command entries varies by vehicle. On some vehicles, user input information, e.g., button press information, is constantly broadcast on a CAN bus, in which case, the determination at block 408 includes monitoring the one or more user input/output devices 216 for user input as it is broadcasted. In other vehicles, one or more control modules 214 (for example, a steering column module (SCM) or a wireless control module (WCM), sometimes referred to as a radio frequency hub (RF HUB)) are polled at block 408 by sending an I/O read request and waiting for a response, as described further below with reference to FIG. 6.

If it is determined at block 528 that no in-vehicle selection sequence has been detected ("NO" at 528), then the procedure 520 returns to block 526. If, on the other hand, it is determined that an in-vehicle selection sequence has been detected ("YES" at 528), then the procedure 520 progresses to block 530. At block 530, the controller device 304 sends, via embedded software, a brake actuation command to one of the one or more control modules 214, e.g., the anti-lock brake module (ABM), of vehicle 206. The particular brake actuation command is based on the in-vehicle selection sequence. In some embodiments, the memory 314 stores a list of multiple in-vehicle selection sequences corresponding to brake actuation commands, and at block 530 the in-vehicle selection sequence is matched to one of the brake actuation commands on the list. The transmission of the brake actuation command is described in further detail below, in reference to FIG. 7. The procedure 520 then progresses to block 532. At block 532, the controller device 304 actuates the brake control scheme that matches the brake actuation command via the ABM. The brake control scheme may be a full or partial actuation of any one or a combination of the vehicle brakes 212.

At block 534, a determination is made as to whether a brake actuation scheme is currently actuated. In particular, for instance, the controller device 304 detects whether one or more of the vehicle brakes 212 are currently actuated in accordance with a listed brake actuation command stored in the memory 314.

If it is determined at block 534 that no brake actuation scheme is currently actuated ("NO" at 534), then the procedure 520 returns to block 522. If, on the other hand, it is determined that a brake actuation scheme is currently actuated ("YES" at 534), then the procedure 520 progresses to block 536.

At block 536, the controller device 304 sends, via embedded software, a brake disablement command to one of the one or more control modules 214, e.g., the anti-lock brake module (ABM), of vehicle 206. The transmission of the brake disablement command is described in further detail below, in reference to FIG. 7. The procedure 520 then progresses to block 538. At block 538, the controller device 304 disables the brake control scheme, based on the brake disablement command, via the ABM. In some embodiments, disabling the brake control scheme results in all of the brakes that were actuated immediately no longer being actuated, and control of brake actuation returning to the user via the brake pedal. In other embodiments, disabling the brake control scheme results in all of the brakes immediately being fully actuated, e.g., stopping the car, and the control of brake actuation then returning to the user via the brake pedal once the user accelerates the car from the full stop. Procedure 500 then returns to block 522.

Figure 6:
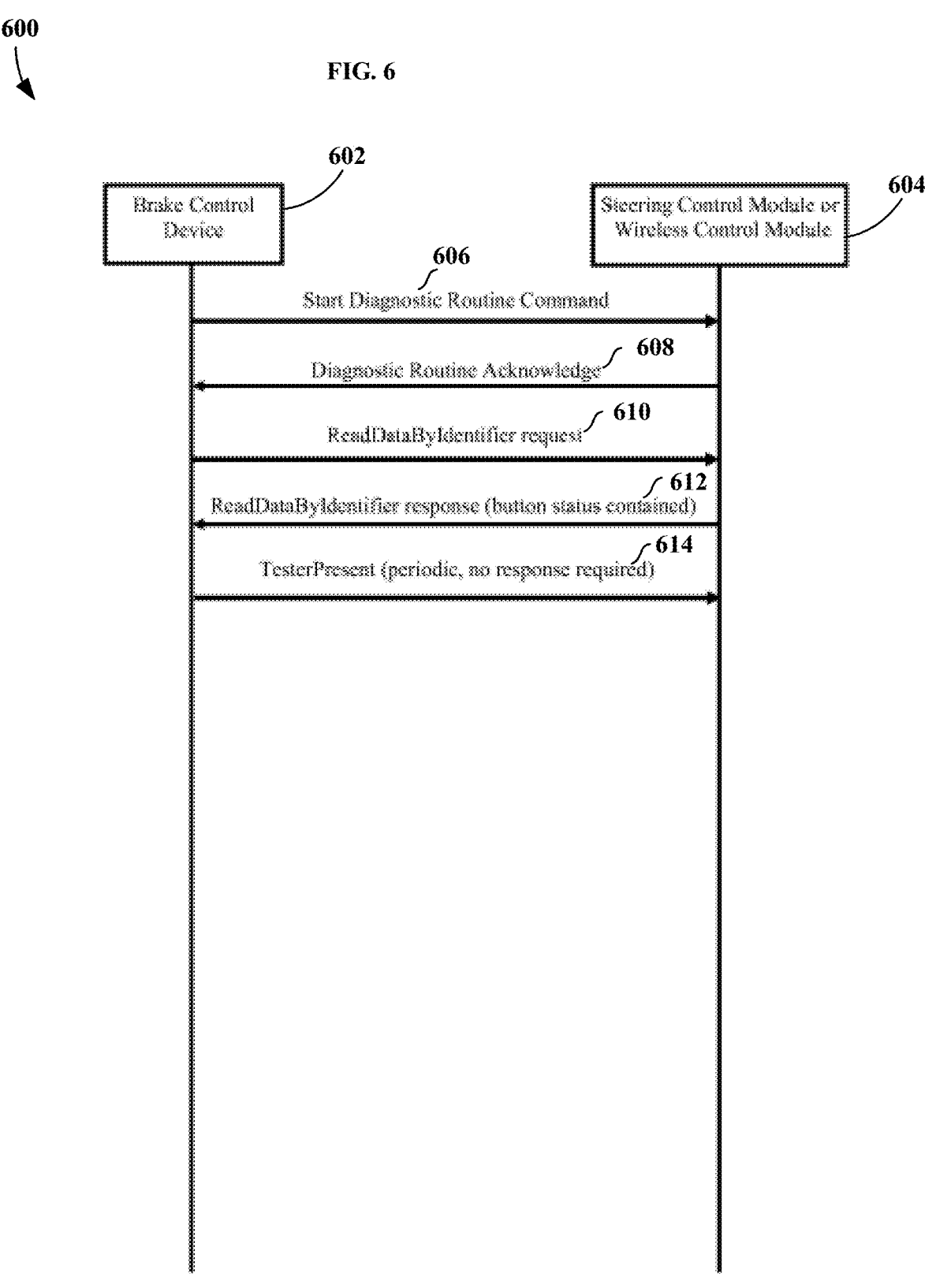
FIG. 6 is a process flow diagram that illustrates aspects of the manner in which the embedded software detects in-vehicle selection sequences, in accordance with the present disclosure.

Reference is now made to FIG. 6, which is a process flow diagram that illustrates aspects of the manner in which the embedded software detects in-vehicle selection sequences, in accordance with the present disclosure. The system 600 includes brake control device 602 and steering column module (SCM) and/or wireless control module (WCM) 604. In some embodiments, brake control device 602 is the onboard diagnostic plug-in device 204, with controller device 304 that can execute embedded software programs. In some embodiments, the SCM and/or the WCM 604 are one or more of the control modules 214 of vehicle 206.

In some embodiments, at 606, the brake control device 602 transmits, via embedded software, to the SCM and/or the WCM 604, a "start diagnostic session" command. In some embodiments, at 608, the brake control device 602 then receives an acknowledgement of the diagnostic routine commencement from the SCM and/or the WCM 604. Next, in some embodiments, the brake control device 602 transmits, via embedded software, to the SCM and/or the WCM 604, a "readDataByIdentifier" request, along with the correct value to read user inputs from the one or more user input/output devices 216. Next, in some embodiments, at 608, the brake control device 602 then receives a "readDataByIdentifier" response containing the button status of the one or more user input/output devices 216 from the SCM and/or the WCM. Throughout, in some embodiments, at 614, the brake control device 602 transmits, via embedded software, to the SCM and/or the WCM, a "TesterPresent" command periodically (e.g., at least once per second) to keep the "readDataByIdentifier" command running, with no response required from the SCM and/or the WCM 604.

Reference is now made to FIG. 7, which is a process flow diagram that illustrates aspects of the manner in which the embedded software sends brake actuation commands to the ABM of the vehicle, in accordance with the present disclosure. The system 700 includes brake control device 702 and anti-lock brake module (ABM) 704. In some embodiments, brake control device 702 is the onboard diagnostic plug-in device 204, with controller device 304 that can execute embedded software programs. In some embodiments, the ABM 704 is one of the one or more control modules 214 of vehicle 206. The embedded software controls individual vehicular brakes by using unified diagnostic services (UDS) commands and/or ISO KWP commands (depending on the vehicle model) to command an individual brake to be unactuated, or partially actuated, or completely actuated, or to return control of the brake to the electronic control module, which may be any one of control modules 214, of vehicle 206.

In some embodiments, at 706, the brake control device transmits, via embedded software, to the ABM 704, a "start diagnostic routine" command. Next, in some embodiments, at 708, the brake control device 702 then receives an acknowledgement of the diagnostic routine commencement from the ABM 704. Next, in some embodiments at 710, the brake control device 702 transmits an "I/O Control" command, which specifies a vehicle brake of the vehicle brakes 212 of vehicle 206, and whether that brake is to be commanded to be in an unactuated position (e.g., applying no braking force), a partially actuated position (applying an amount of braking force that falls at some point in between zero braking force and full or maximum braking force), or a completely actuated position (applying full or maximum braking force). In some embodiments, at 712, the brake control device 702 then receives an acknowledgement of the I/O control command from the ABM 704. Next, if necessary, at 714, the brake control device 702 transmits a second "I/O Control" command. In this case, at 716, the brake control device 702 then receives a second acknowledgement of the second I/O control command from the ABM 704. Throughout, in some embodiments, at 718, the brake control device 702 transmits, via embedded software, to the ABM, a "TesterPresent" command periodically (e.g., at least once per second) to keep the "I/O Control" command running, with no response required from the ABM 704. In some embodiments, after the I/O control is set to return control to the electronic control module, which may be any one of control modules 214, of vehicle 206, an "end diagnostic session" command is transmitted from the brake control device 702 to the ABM 704.

Figure 8:
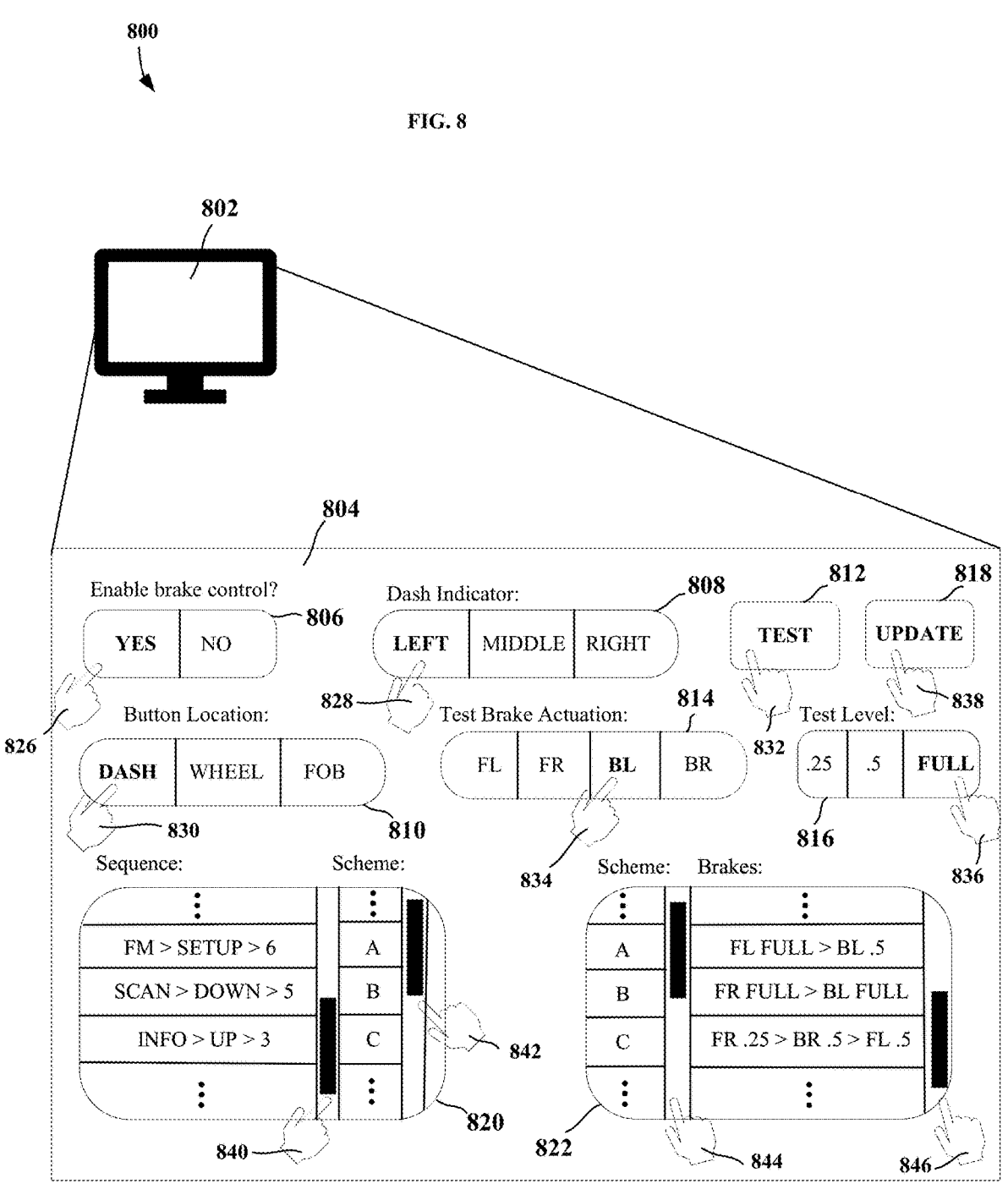
FIG. 8 illustrates an example user interface for preconfiguring the personal computing application, in accordance with the present disclosure.

Reference is now made to FIG. 8, which illustrates an example user interface for preconfiguring the personal computing application, in accordance with the present disclosure. System 800 includes computing device 802 for carrying out the personal computing application, which includes example user interface screen 804, which includes brake enablement selection grid 806, dash indicator selection grid 808, button location selection grid 810, test button 812, test brake actuation selection grid 814, test level selection grid 816, update button 818, selection sequence/scheme scrollable grid 820, and brake actuation/scheme scrollable grid 822. In some embodiments, computing device 802 is computing device 202 of FIG. 2.

In some embodiments, the brake enablement selection grid 806 includes user selectable options "YES" (enable brake control) and "NO" (disable brake control). In some embodiments, the personal computing application receives a user selection 826 of the user selectable option "YES," triggering brake control to be enabled on the personal computing application. When brake control is enabled on the personal computing application, the process steps of any one of procedure 400, 500, and/or 520 may be triggered to occur using the onboard diagnostic plug-in device 204 of FIG. 2. When brake control is disabled on the personal computing application, the process steps of any one of procedure 400, 500, and/or 520 will not occur.

In some embodiments, dash indicator selection grid 808 includes user selectable options, e.g., "LEFT," (show an indicator that brake control is enabled on the left side of the dashboard of vehicle 206) "MIDDLE," (show an indicator that brake control is enabled in the middle of the dashboard of vehicle 206) and "RIGHT" (show an indicator that brake control is enabled in the middle of the dashboard of vehicle 206). In some embodiments, the personal computing application receives a user selection 828 of "LEFT," which, in some instances, if brake control has been enabled within brake enablement selection grid 806, will trigger an indicator to be shown in vehicle 206 on the left of the dashboard, e.g., the words "BRAKE CONTROL ENABLED" lit up. In the same way, in other instances a selection of "MIDDLE" or "RIGHT" may trigger an indicator to be shown in vehicle 206 on the middle or right, respectively, of the dashboard.

In some embodiments, button location selection grid 810 includes user selectable options, e.g., "DASH" (show options for dashboard device of user input/output devices 216 button sequences), "WHEEL" (show options for steering wheel device of user input/output devices 216 button sequences), and "FOB" (show options for key fob device of user input/output devices 216 button sequences). In some embodiments, the personal computing application receives a user selection 830 of "DASH," which, in some instances, triggers selection sequence/scheme scrollable grid 820 to display options for dashboard button sequences to be paired with brake actuation schemes. In the same way, in other instances a selection of "WHEEL" may trigger selection sequence/scheme scrollable grid 820 to display options for steering wheel button sequences to be paired with brake actuation schemes, and a selection of "FOB" may trigger selection sequence/scheme scrollable grid 820 to display options for key fob button sequences to be paired with brake actuation schemes.

In some embodiments, the personal computing application receives a user selection 832 of test button 812, which triggers a test of certain brakes of vehicle brakes 212 of vehicle 206 at certain brake actuation levels. In some embodiments, test brake actuation selection grid 814 includes user selectable options, e.g., "FL" (front left brake of vehicle brakes 212), "FR" (front right brake of vehicle brakes 212), "BL" (back left brake of vehicle brakes 212), and "BR" (back right brake of vehicle brakes 212). In some embodiments, the personal computing application may receive a user selection 834 of "BL," causing the personal computing application, upon receiving a user selection 832 of test button 812, to test actuation of the back left brake of vehicle brakes 212. In some embodiments, test level selection grid 816 includes user selectable options, e.g., "0.25" (test 25% of full actuation), "0.5" (test 50% of full actuation), and "FULL" (test full actuation). In some embodiments, the personal computing application receives a user selection 836 of "FULL," causing the personal computing application, upon receiving a user selection 832 of test button 812, to test at full actuation the brake selected within test brake actuation selection grid 814, e.g., the back left brake of vehicle brakes 212.

In some embodiments, the personal computing application receives a user selection 838 of update button 818. In some instances, this triggers the personal computing application to update its system firmware.

In some embodiments, selection sequence/scheme scrollable grid 820 includes selection sequence options, e.g., "FM>SETUP>6," "SCAN>DOWN>5," and "INFO>UP>3," and letters representing brake actuation schemes, e.g., "A," "B," and "C." In some embodiments, the personal computing application receives a user scroll action 840 and a user scroll action 842 to align sequences with scheme letters, e.g., "FM>SETUP>6" with "A," "SCAN>DOWN>5" with "B," and "INFO>UP>3" with "C." In some instances, this causes the brake actuation scheme lined up with the selection sequence to be actuated when the selection sequence is detected by the onboard diagnostic plug-in device 204, e.g., brake actuation scheme "A" is actuated when the "FM>SETUP>6" selection sequence is detected, brake actuation scheme "B" is actuated when the "SCAN>DOWN>5" selection sequence is detected, and brake actuation scheme "C" is actuated when the "INFO>UP>3" selection sequence is detected.

In some embodiments, brake actuation/scheme scrollable grid 822 includes letters representing brake actuation schemes, e.g., "A," "B," and "C," and brake actuation patterns, e.g., "FL FULL>BL.5," "FR FULL>BL FULL," and "FR 0.25>BR 0.5>FL.5." In some embodiments, the personal computing application receives a user scroll action 844 and a user scroll action 846 to align scheme letters with actuation patterns, e.g., "A" with "FL FULL>BL.5," "B" with "FR FULL>BL FULL," and "C" with "FR.25>BR.5>FL.5." In some instances, this causes the brake actuation pattern lined up with the brake actuation scheme to be carried out when the selection sequence lined up with the same brake actuation scheme in selection sequence/scheme scrollable grid 820 is detected by the onboard diagnostic plug-in device, e.g., "FL FULL>BL.5" when the selection lined up with scheme "A" is detected, "FR FULL>BL FULL" when the selection lined up with scheme "B" is detected, and "FR.25>BR.5>FL.5" when the selection lined up with scheme "C" is detected.

Figure 9A:
FIG. 9A illustrates aspects of the manner in which in-vehicle selection sequences may be received through button presses by the user on the vehicle dashboard, in accordance with the present disclosure.

Reference is now made to FIG. 9A, which illustrates aspects of the manner in which in-vehicle selection sequences may be received through button presses by the user on the vehicle dashboard, in accordance with the present disclosure. The dashboard 900 includes a "scan" button 902, a "down" button 904, and a "5" button 906. In some embodiments, the dashboard 900 is one of the one or more user input/output devices 216 connected to vehicle 206. In some embodiments, controller device 304 detects a user input command 908 of a user selecting the scan" button 902. In some embodiments, controller device 304 detects a user input command 910 of a user selecting the "down" button 904. In some embodiments, controller device 304 detects a user input command 912 of a user selecting the "5" button 906. In some embodiments, a user may enter user input command 908, user input command 910, and user input command 912 individually or in some simultaneous combination or sequential combination. If user input command 908, user input command 910, and user input command 912 comprise an in-vehicle selection sequence that is listed on the list of multiple in-vehicle selection sequences corresponding to brake actuation commands in the memory 314, the corresponding brake actuation command is transmitted, as described above with reference to FIGS. 4, 5A, and/or 5B.

Figure 9B:
FIG. 9B illustrates aspects of the manner in which in-vehicle selection sequences may be received through button presses by the user on the vehicle steering wheel, in accordance with the present disclosure.

Reference is now made to FIG. 9B, which illustrates aspects of the manner in which in-vehicle selection sequences may be received through button presses by the user on the vehicle steering wheel, in accordance with the present disclosure. The steering wheel 920 includes a "volume up" button 922, a "voice assistant" button 924, and a "cancel action" button 926. In some embodiments, the steering wheel 920 is one of the one or more user input/output devices 216 connected to vehicle 206. In some embodiments, controller device 304 detects a user input command 928 of a user selecting the "volume up" button 922. In some embodiments, controller device 304 detects a user input command 930 of a user selecting the "voice assistant" button 924. In some embodiments, controller device 304 detects a user input command 932 of a user selecting the "cancel action" button 926. In some embodiments, a user may enter user input command 928, user input command 930, and user input command 932 individually or in some simultaneous combination or sequential combination. If user input command 928, user input command 930, and user input command 932 comprise an in-vehicle selection sequence that is listed on the list of multiple in-vehicle selection sequences corresponding to brake actuation commands in the memory 314, the corresponding brake actuation command is transmitted, as described above with reference to FIGS. 4, 5A, and/or 5B.

Reference is now made to FIG. 9C, which illustrates aspects of the manner in which in-vehicle selection sequences may be received through button presses by the user on the vehicle key fob, in accordance with the present disclosure. The key fob 940 includes an "unlock" button 942 and an "open trunk" button 944. In some embodiments, the key fob 940 is one of the one or more user input/output devices 216 connected to vehicle 206. In some embodiments, controller device 304 detects a user input command 946 of a user selecting the "unlock" button 942. In some embodiments, controller device 304 detects a user input command 948 of a user selecting the "open trunk" button 944. In some embodiments, a user may enter user input command 946 and user input command 948 individually or in some simultaneous combination or sequential combination. If user input command 946 and user input command 948 comprise an in-vehicle selection sequence that is listed on the list of multiple in-vehicle selection sequences corresponding to brake actuation commands in the memory 314, the corresponding brake actuation command is transmitted, as described above with reference to FIGS. 4, 5A, and/or 5B.

Any one of the user input commands 908, 910, 912, 928, 930, 932, 946, and/or 948, or any other user input command resulting from a user selection on a button on any user input device of user input/output devices 216 associated with vehicle 206 may be entered individually or in some simultaneous combination or in sequential combination. If any combination of user input commands comprises an in-vehicle selection sequence that is listed on the list of multiple in-vehicle selection sequences corresponding to brake actuation commands in the memory 314, the corresponding brake actuation command is transmitted, as described above with reference to FIGS. 4, 5A, and/or 5B.

Reference is now made to FIG. 10 which is a process flow diagram that illustrates an example procedure for preconfiguring the personal computing application, in accordance with the present disclosure. In some embodiments, the personal computing application may be computing device 802 of FIG. 8. At block 1002, the personal computing application receives a user selection of whether or not to enable brake control via a user interface screen. In some embodiments, the user interface screen may be the user interface screen 804 of FIG. 8. In some embodiments, process 1000 then proceeds to block 1004, wherein the personal computing application stores the user selection of whether or not to enable brake control via a user interface screen. In some embodiments, the user selection of whether or not to enable brake control is carried out on the brake enablement selection grid 806 of FIG. 8. The user selection may be changed at any time through the personal computing application; when brake control is enabled on the personal computing application, the process steps of any one of procedure 400, 500, and/or 520 may be triggered. When brake control is disabled on the personal computing application, the process steps of any one of procedure 400, 500, and/or 520 will not occur.

At block 1006, the personal computing application receives a user selection of which vehicular brakes, e.g., the vehicle brakes 212 of vehicle 206 within FIG. 2, to actuate and how much to actuate the vehicular brakes in response to certain in-vehicle button presses on, e.g., one or more of the user input/output devices 216 within FIG. 2, via the user interface screen. In some embodiments, the user selection of which vehicular brakes to actuate and how much to actuate the vehicular brakes in response to certain in-vehicle button presses is carried out on the brake actuation/scheme scrollable grid 822 of FIG. 8. In some embodiments, process 1000 may then proceed to block 1008, wherein the personal computing application stores the user selection of which vehicular brakes to actuate and how much to actuate the vehicular brakes in response to certain in-vehicle button presses via the user interface screen.

At block 1010, the personal computing application receives a user selection of which dash indicator, e.g., one of the one or more indicators 218 of vehicle 206, is employed to indicate that brake control is enabled via the user interface screen. In some embodiments, the user selection of which dash indicator is employed to indicate that brake control is enabled via the user interface screen is carried out on the dash indicator selection grid 808 of FIG. 8. In some embodiments, process 1000 may then proceed to block 1012, wherein the personal computing application stores the user selection of which dash indicator is employed to indicate that brake control is enabled via the user interface screen.

At block 1014, the personal computing application receives a user selection of which brake control scheme of multiple brake control schemes correspond to certain in-vehicle button presses on, e.g., one or more of the user input/output devices 216 within FIG. 2, via the user interface screen. In some embodiments, the user selection of which brake control scheme of multiple brake control schemes correspond to certain in-vehicle button presses via the user interface screen is carried out on the selection sequence/scheme scrollable grid 820 of FIG. 8. In some embodiments, process 1000 may then proceed to block 1016, wherein the personal computing application stores the user selection of which brake control scheme of multiple brake control schemes correspond to certain in-vehicle button presses via the user interface screen.

At block 1018, the personal computing application receives a user selection to test the control over actuation of one or more vehicle brakes, e.g., the vehicle brakes 212 of vehicle 206 within FIG. 2. In some embodiments, the user selection to test the control over actuation of one or more vehicle brakes is carried out on the test button 812. In some embodiments, process 1000 may then proceed to block 1020, wherein the personal computing application tests the control over actuation of one or more vehicle brakes, e.g., the vehicle brakes 212 of vehicle 206 within FIG. 2. In some embodiments, the user selection of which brakes are tested and the level of actuation at which they are tested is carried out on the test brake actuation selection grid 814, and the test level selection grid 816 of FIG. 8.

At block 1022, the personal computing application receives a user selection to update the system firmware. In some embodiments, the user selection to update the system firmware is carried out on update button 818 of FIG. 8. In some embodiments, the process 1000 may then proceed to block 1024, wherein the personal computing application updates the system firmware.

Figure 11:
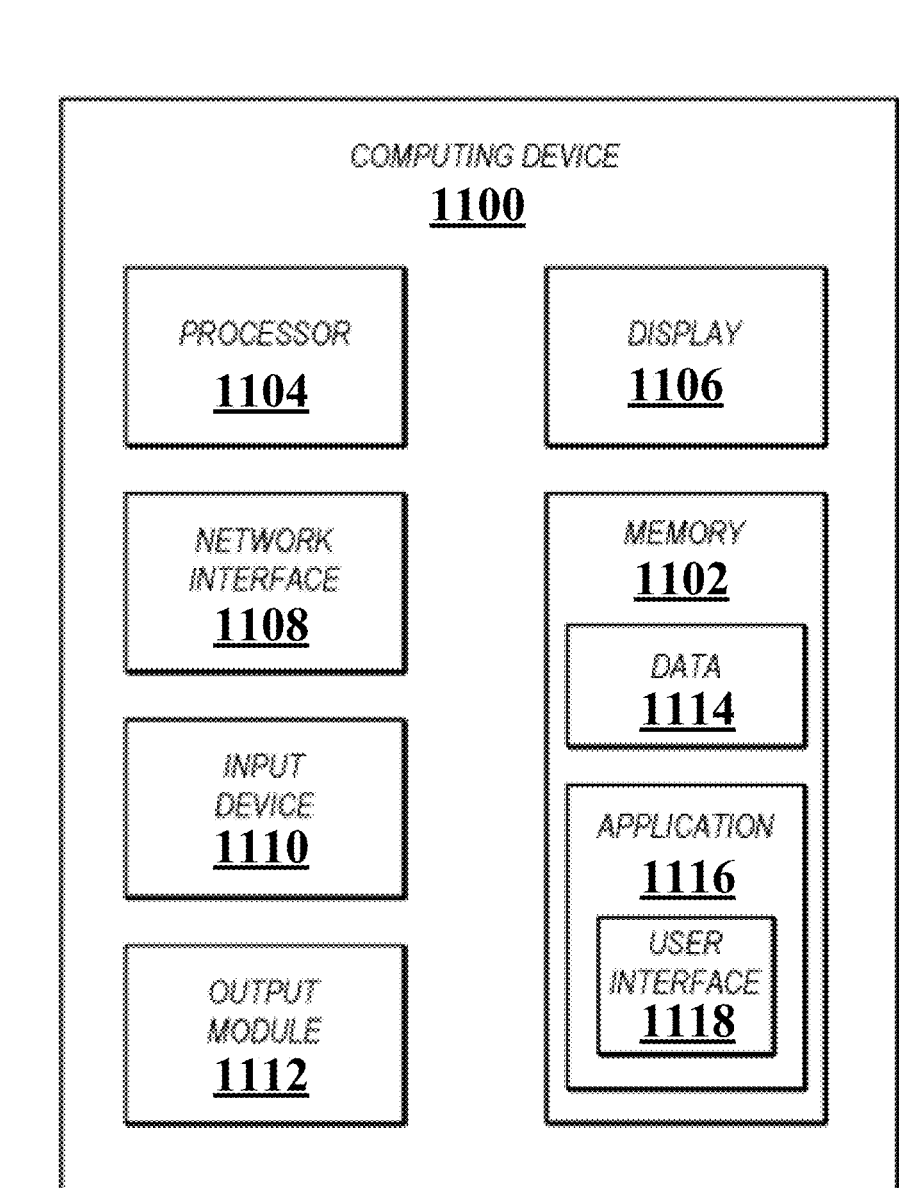
FIG. 11 is a schematic block diagram of an example computing device that may be employed in various embodiments of the present disclosure.

Reference is now made to FIG. 11, which is a schematic block diagram of an example computing device that may be employed in various embodiments of the present disclosure. Although not explicitly shown in FIG. 2 or FIG. 3, in some example embodiments, the computing device 1100, or one or more components thereof, are included in, and/or employed within, one or more components of the system 200, such as, for example, the computing device 202, the onboard diagnostic plug-in device 204, and/or other components. In this regard, the computing device 1100, or one or more of the components thereof, may further represent one or more components of the system 200, such as, for example, the computing device 202, and the onboard diagnostic plug-in device 204.

The computing device 1100, may, in various embodiments, include one or more memories 1102, processors 1104, displays 1106, network interfaces 1108, input devices 1110, and/or output modules 1112. The memory 1102 includes non-transitory computer-readable storage media for storing data and/or software that is executable by the processor 1104 and which controls the operation of the computing device 1100. In an example embodiment, the memory 1102 may include one or more solid-state storage devices such as flash memory chips. Alternatively, or in addition to the one or more solid-state storage devices, the memory 1102 may include one or more mass storage devices connected to the processor 1104 through a mass storage controller (not shown in FIG. 11) and a communications bus (not shown in FIG. 11). Although the description of computer-readable media contained herein refers to a solid-state storage, it should be appreciated by those skilled in the art that computer-readable storage media can be any available media that can be accessed by the processor 1104. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information, which can be accessed by computing device 1100.

In some embodiments, the memory 1102 stores data 1114 and/or an application 1116. In some aspects, the application 1116 includes a user interface component 1118 that, when executed by the processor 1104, causes the display 1106 to present a user interface (not shown in FIG. 11), such as user interface screen 804 within FIG. 8. The network interface 1108, in some examples, is configured to couple the computing device 1100 and/or individual components thereof to a network, such as a wired network, a wireless network, a local area network (LAN), a wide area network (WAN), a wireless mobile network, a Bluetooth network, the Internet, and/or another type of network. The input device 1110 may be any device by means of which a user may interact with the computing device 1100. Examples of the input device 1110 include without limitation a mouse, a keyboard, a touch screen, a voice interface, and/or the like. The output module 1112 may, in various embodiments, include any connectivity port or bus, such as, for example, a parallel port, a serial port, a universal serial bus (USB), or any other similar connectivity port known to those skilled in the art.

The example embodiments described herein may be implemented using hardware, software or any combination thereof and may be implemented in one or more computer systems or other processing systems. Additionally, one or more of the steps described in the example embodiments herein may be implemented, at least in part, by machines. Example machines that may be useful for performing the operations of the example embodiments herein include general purpose digital computers, specially programmed computers, desktop computers, server computers, client computers, portable computers, mobile communication devices, tablets, and/or similar devices.

The above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automotive braking control, the method comprising:

monitoring, via embedded software, the status of predetermined vehicle conditions of a vehicle;

in response to detecting, via the embedded software, the activation of one or more of the predetermined vehicle conditions, wherein activation of one or more of the predetermined vehicle conditions comprises one or more of: the speed of a vehicle falling beneath a threshold speed, no depression of the brake pedal, the steering wheel being turned within a threshold distance from a left lock or right lock position, and the vehicle entering four-wheel drive:

monitoring the vehicle, via embedded software, to detect a plurality of possible in-vehicle selection sequences, wherein the plurality of possible in-vehicle selection sequences each comprise one or more button presses preconfigured by the user via a personal computing application to cause a plurality of possible brake control schemes, and wherein each of the plurality of possible brake control schemes are preconfigured by the user via the personal computing application to comprise a sequence, duration, and brake actuation force level by which to actuate one or more particular brakes of the vehicle;

in response to detecting, via the embedded software, one of the plurality of possible in-vehicle selection sequences executed by a user:

based on the detected one of the plurality of possible in-vehicle selection sequences:

sending, via the embedded software, a brake actuation command to an anti-lock brake module (ABM) of the vehicle; and based on the brake actuation command:

actuating, via the ABM, a brake control scheme to actuate the one or more particular brakes of the vehicle in accordance with the sequence, duration, and brake actuation force level preconfigured for the detected one of the plurality of possible in-vehicle selection sequences.

2. The method of claim 1, further comprising: in response to detecting, via the embedded software, a second one of the plurality of possible in-vehicle selection sequences executed by the user:

in response to determining that the brake control scheme is currently actuated:

sending, via the embedded software, a brake disablement command to the ABM of the vehicle; and based on the brake disablement command:

disabling, via the ABM, the brake control scheme.

3. The method of claim 1, further comprising:

in response to detecting, via the embedded software, that none of the predetermined vehicle conditions are activated:

in response to determining that the brake control scheme is currently actuated:

sending, via the embedded software, a brake disablement command to the ABM of the vehicle; and based on the brake disablement command:

disabling, via the ABM, the brake control scheme.

4. The method of claim 1, wherein the one or more button presses are of buttons located on the dashboard of the vehicle, the steering wheel of the vehicle and key fobs associated with the vehicle.

5. The method of claim 1, wherein preconfiguring the personal computing application comprises:

receiving, via a user interface screen, a user selection of whether or not to enable brake control;

receiving, via the user interface screen, a user selection of which brake control scheme of multiple brake control schemes correspond to certain in-vehicle button presses;

receiving, via the user interface screen, a user selection of which vehicular brakes to actuate and how much to actuate the vehicular brakes in response to certain in-vehicle button presses;

receiving, via the user interface screen, a user selection of which dash indicator is employed to indicate that brake control is enabled;

receiving, via the user interface screen, a user selection to test the control over actuation of one or more vehicular brakes;

storing, in the memory, the user selection of whether or not to enable brake control;

storing, in the memory, the user selection of which vehicular brakes to actuate and how much to actuate the vehicular brakes in response to certain in-vehicle button presses;

storing, in the memory, the user selection of which dash indicator is employed to indicate that brake control is enabled;

storing, in the memory, the user selection of which brake control scheme of multiple brake control schemes correspond to certain in-vehicle button presses;

testing the control over actuation of one or more vehicular brakes; and upon receiving, from a server, updates to the system firmware, updating the system firmware.

6. The method of claim 1, wherein the embedded software detects the plurality of possible in-vehicle selection sequences by broadcasting information relating to the plurality of possible in-vehicle selection sequences on a communication bus of an automotive vehicle, wherein the communication bus is a controller area network (CAN) bus.

7. The method of claim 1, wherein the embedded software detects the plurality of possible in-vehicle selection sequences by polling one or more of a steering column module (SCM) and a wireless control module (WCM) of the vehicle by transmitting an I/O read request and awaiting a response.

8. The method of claim 7, wherein polling one or more of the SCM and the WCM of the vehicle by transmitting an I/O read request and awaiting a response further comprises:

transmitting, via the embedded software, to one or more of the SCM and the WCM, a command to start a diagnostic session;

transmitting, via the embedded software, to one or more of the SCM and the WCM, a command to read the each in-vehicle selection sequence, along with the correct values to read the each in-vehicle selection sequence; and transmitting, via the embedded software, to one or more of the SCM and the WCM, a periodic tester command to ensure the command to read the each in-vehicle selection sequence is running.

9. The method of claim 1, wherein sending, via the embedded software, the brake actuation command to the ABM of the vehicle, further comprises:

transmitting, via the embedded software, to the ABM, a command to start a diagnostic session;

transmitting, via the embedded software, to the ABM, one or more input/output control commands, wherein the one or more input/output control commands each specify one or more particular vehicle brakes and the actuation level of the each one or more particular vehicle brakes;

transmitting, via the embedded software, to the ABM, a periodic tester command to ensure the one or more input/output control commands are running; and transmitting, via the embedded software, a command to end the diagnostic session.

10. An onboard diagnostic plug-in dongle device, wherein the device aids in tight radius off-road turns by locking or dragging the inside rear tire of the direction turning, the device comprising:

a shell;

a plug;

a printed circuit (PC) board comprising:

a microcontroller;

a controller area network (CAN) controller;

a physical layer device (PHY);

a universal serial bus (USB) bridge and connector;

an indicator LED; and a memory storing embedded program instructions that, when executed by microcontroller, cause the microcontroller to perform operations comprising:

monitoring, via embedded software, the status of predetermined vehicle conditions of a vehicle;

in response to detecting, via the embedded software, the activation of one or more of the predetermined vehicle conditions:

monitoring the vehicle, via embedded software, to detect in-vehicle selection sequences;

in response to detecting, via the embedded software, an in-vehicle selection sequence by a user:

based on the in-vehicle selection sequence:

sending, via the embedded software, a brake actuation command to an anti-lock brake module (ABM) of the vehicle; and based on the brake actuation command:

actuating, via the ABM, a brake control scheme, wherein the brake control scheme is a particular sequence, duration, and brake actuation force level by which to actuate one or more particular brakes of the vehicle.

11. The device of claim 10, wherein the microcontroller executes the embedded software via the CAN controller and the PHY.

12. The device of claim 10, wherein the plug is an OBD2 plug, and wherein the plug is installed into the OBD2 diagnostic connector of the vehicle.

13. The device of claim 10, wherein the plug is installed by unplugging the vehicle security gateway (SGW) module of the vehicle and plugging the device in its place, directly or via an extension cable.

14. The device of claim 10, wherein the onboard diagnostic plug-in dongle device further comprises a bypass module that bypasses the security gateway (SGW) of the vehicle.

15. The device of claim 10, wherein the microcontroller communicates with a personal computing application via the USB bridge and connector.

16. A non-transitory computer readable medium comprising instructions that, when executed by the microcontroller of an onboard diagnostic plug-in dongle, cause the microcontroller to perform operations comprising:

monitoring, via embedded software, the status of predetermined vehicle conditions of a vehicle;

in response to detecting, via the embedded software, the activation of one or more of the predetermined vehicle conditions, wherein activation of one or more of the predetermined vehicle conditions comprises one or more of: the speed of a vehicle falling beneath a threshold speed, no depression of the brake pedal, the steering wheel being turned within a threshold distance from a left lock or right lock position, and the vehicle entering four-wheel drive:

monitoring the vehicle, via embedded software, to detect a plurality of possible in-vehicle selection sequences, wherein the plurality of possible in-vehicle selection sequences each comprise one or more button presses preconfigured by the user via a personal computing application to cause a plurality of possible brake control schemes, and wherein each of the plurality of possible brake control schemes are preconfigured by the user via the personal computing application to comprise a sequence, duration, and brake actuation force level by which to actuate one or more particular brakes of the vehicle;

in response to detecting, via the embedded software, one of the plurality of possible in-vehicle selection sequence by a user:

based on the detected one of the plurality of possible in-vehicle selection sequences:

sending, via the embedded software, a brake actuation command to an anti-lock brake module (ABM) of the vehicle; and based on the brake actuation command:

actuating, via the ABM, a brake control scheme, to actuate the one or more particular brakes of the vehicle in accordance with the sequence, duration, and brake actuation force level preconfigured for the detected one of the plurality of possible in-vehicle selection sequences.

* * * * *